Oct. 28, 1941.   A. O. WILLIAMS   2,260,879
BRAKE RIGGING
Filed Dec. 13, 1939   2 Sheets-Sheet 1
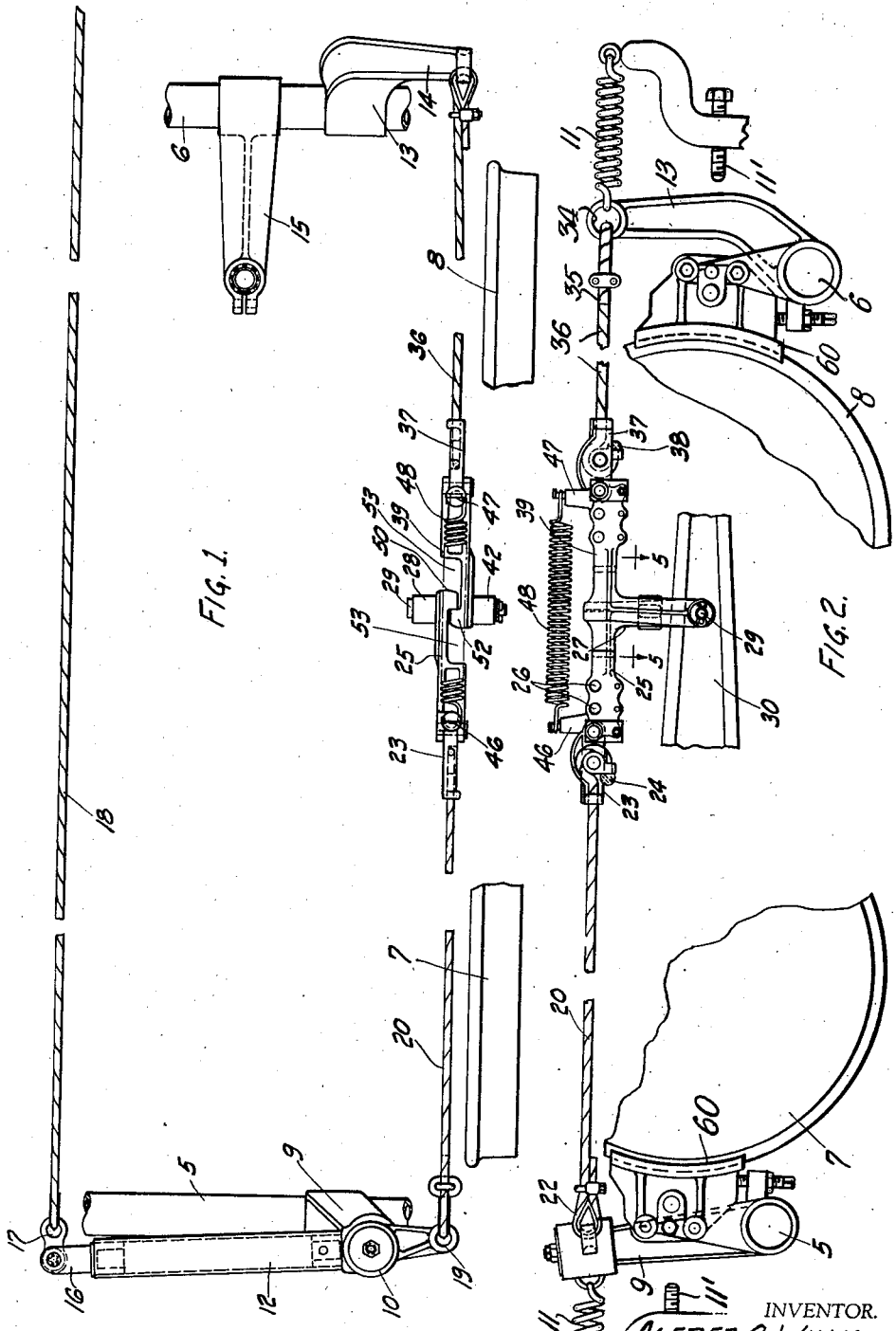
INVENTOR.
ALFRED O. WILLIAMS.
BY Walter E. Schirmer
ATTORNEY.

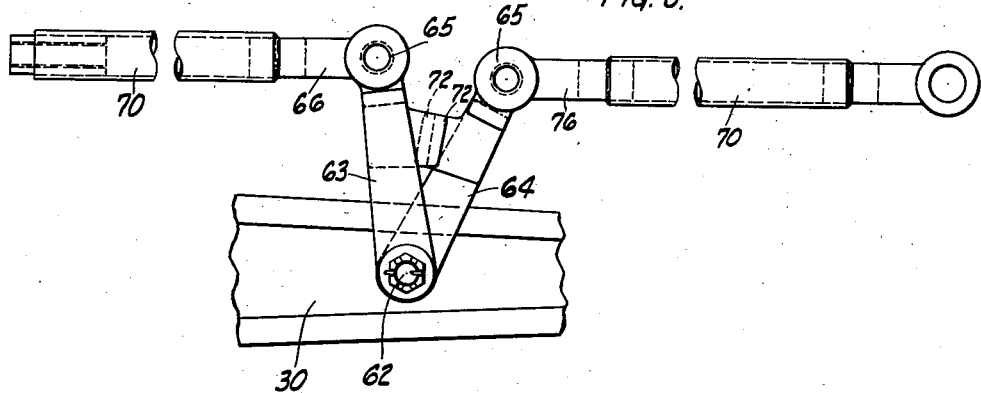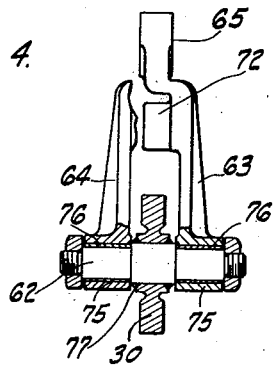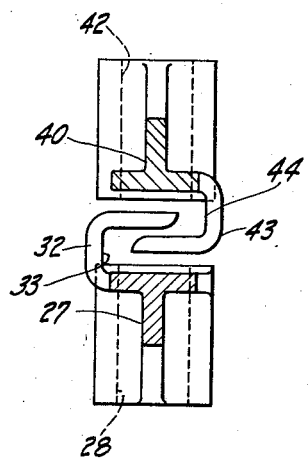

Patented Oct. 28, 1941

2,260,879

UNITED STATES PATENT OFFICE 2,260,879

BRAKE RIGGING

Alfred O. Williams, Battle Creek, Mich., assignor to Clark Equipment Company, Buchanan, Mich., a corporation of Michigan Application December 13, 1939, Serial No. 308,917

5 Claims. (Cl. 188—50)

This invention relates to brake rigging, and more particularly is directed to an equalizer arrangement for brake rigging of the type shown in the copending application of Burrows et al., Serial No. 195,532, filed March 12, 1938, now Patent No. 2,221,074, of November 12, 1940.

The present invention contemplates the addition, in a brake system such as disclosed in said copending application, of an equalizer and pick-up arrangement for maintaining the brake system against rattling when in brake-released position, and allowing power operation of the brake mechanism without disturbing the hand brake linkage.

One of the objects of the present invention is to provide an equalizing pick-up arrangement which is interposed in the connection between the brake cross shafts and which includes opposed pick-up levers which are normally tensioned toward disengaged position, but upon actuation of the hand brake mechanism are adapted to engage to provide for the transmission of tension between the two cross shafts to actuate the brakes thereon. Suitable spring means is employed to insure the maintenance of tension on the connecting cables when the power brake application is made, which results in movement of the brake cross shafts. This maintains the system against rattling or vibration, and insures that the cables will at all times be sufficiently tensioned so as to have no chance to either rattle or drop into undesired locations.

Other objects and advantages of the present invention will appear more fully from the following detailed description which, taken in conjunction with the accompanying drawings, will disclose to those skilled in the art the particular construction and operation of a preferred form of the present invention.

In the drawings:

Figure 1 is a somewhat diagrammatic top plan view of a brake rigging embodying the present invention;

Figure 2 is a corresponding elevational view of the rigging shown in Figure 1 in brake applied position;

Figure 3 is a detail view of a slight modification of the pick-up levers;

Figure 4 is an end view of the lever arrangement shown in Figure 3; and

Figure 5 is a sectional view taken substantially on line 5—5 of Figure 2.

Referring now in detail to the embodiment of the invention shown in Figures 1 and 2, the brake cross shafts are indicated at 5 and 6, respectively, and are mounted longitudinally upon the car wheels 7 and 8 which are supported on transverse axles. The cross shaft 5 is provided with a vertically extending arm 9 rigidly secured thereto by welding or the like, and having a bearing or journal portion 10 at its upper end upon which is mounted a horizontally extending lever 12 pivoted intermediate its ends on the journal portion 10. Each of the cross shafts 5 and 6 is provided with a spring 11 tending to urge the cross shaft toward brake releasing position. Such springs are conventional in this type of truck, and suitable stops 11' carried by the end frame members of the truck limit the movement of the cross shafts under the influence of springs 11.

The other cross shaft 6 is provided with a vertically extending arm 13 having a laterally offset portion 14 at its upper end, the cross shaft 6 also being provided with the horizontally extending arm 15 normally engaged by a power brake cylinder (not shown) for rotating the cross shaft to brake-applying position.

The end 16 of the horizontally pivoted arm 12 has a suitable swivel or eye 17 to which is connected a flexible cable 18 leading to any suitable hand brake actuating mechanism, such as, for example, the mechanism shown in the copending application of Robert J. Burrows et al., Serial No. 256,658, filed February 16, 1939, now Patent No. 2,221,075, issued November 12, 1940.

The opposite end 19 of the lever 12 has connected thereto the flexible cable 20, the cable 20 being provided with a looped end 22 connected into the eye portion of the arm end 19. At its opposite end the cable 20 is secured to a bracket 23, being looped therearound and welded as indicated at 24. The bracket 23 is pivotally mounted on an L-shaped brake pick-up lever 25, the bracket 23 being capable of adjustment relative to the lever 25 by means of the pivot openings 26 which allow tightening of the cable 20 when it has been stretched from use. The lever 25 has a depending portion 27 which is provided at its lower end with the journal opening 28 adapted to be rotatably mounted on the pin 29 carried by the equalizer bar 30 of the truck frame. Intermediate the ends of the depending portion 27 of the arm or lever 25 is a hook-shaped portion 32 forming a channel 33 for a purpose to be hereinafter described.

The end 14 of the lever 13 is provided with an eye portion 34 in which is looped one end 35 of a flexible cable 36 extending between this arm and a bracket 37 corresponding to the bracket 23, the other end of the cable 36 being looped around and welded to the bracket 37, as indicated at 38.

The bracket 37 is pivotally mounted on a second lever or arm 39 corresponding to the arm 25 and having the depending portion 40 terminating at its lower end in the journal portion 42 for pivotally mounting the same on the arm 29. The vertically extending portion 40 of the arm 39 is also provided with a hook portion 43 adapted to form the channel 44 which receives the extending portion of the hook 32. This arrangement keeps the two levers from separating in a lateral direction or axially with respect to the pin 29. Each of the arms 25 and 39 is provided with a vertically extending projection 46 and 47, respectively, between which is tensioned a spring member 48, this spring member normally urging the two arms 25 and 39 in opposite directions about the pivot 29. It is to be understood that springs 11 are so designed as to exert a stronger pull on cables 20 and 36 than spring 48. Each of the arms is provided with laterally offset ear or shoulder portions 50 and 52, respectively, at the top of the vertically extending portions of the arms, which hook portions 50 and 52 overlap in such manner that any tendency of the levers to separate brings the hook portions into abutment to tie the levers rigidly together so that tension applied upon the cable 20 is transmitted to the cable 36 in order to actuate the arm 13, and consequently the cross shaft 6. Similarly, when the tension is released on the cable 20 the spring 48 tends to move the two arms in opposite directions about the pivot pin, and consequently separates the hook portions 50 and 52. The lost motion between the two levers, as indicated by the spaces 53, is sufficient to accommodate the amount of slack in a brake system of this type, and the spring therefore maintains the cables tensioned against rattling or vibration when the hand brake mechanism is in brake released position.

In the operation of the mechanism thus far described, the cable 18 is wound about a drum or the like adapted to be actuated from the interior of the car, and when tensioned, tends to move the lever 12 about the pivot 10. This applies tension to the cable 20, resulting in tensioning the spring 48 until such time as the hook portions 50 and 52 move into abutment. At this point, the cable 20 is rigidly connected to the cable 36, and consequently this tension is applied to the arm 13 tending to move the cross shaft 6 in a direction tending to apply the brake shoes 60 to the wheels 8. However, at the same time, the pivot 10 has a tendency to move to the right, as viewed in Figure 1, to rotate the cross shaft 5 in a direction tending to apply the brake shoes 60 carried thereby against the wheels 7. As a result, equalized braking pressure is applied against all of the wheels. When the hand brake mechanism is released to provide slack in the cable 18, the brake release springs on the cross shafts urge these shafts in brake-releasing direction. At the same time, when the slack becomes sufficient to move the cross shafts to this position, the spring 48 tends to maintain the levers 25 and 39 separated, thereby holding the cables 20, 36 and 18 against rattling or vibration. The total amount of movement is relatively small as only a slight clearance is maintained between the brake shoes and the wheel tread when in brake released position. However, when arms 9 and 13 are moved by springs 11 to a position against stops 11', further slack in the cables 20 and 36 is prevented by spring 48 separating levers 25 and 39.

In Figure 3 is shown a modified form of construction in which the equalizer bar 30 is provided with the pivot pin 62 carrying the vertically extending levers 63 and 64. At their upper ends, each of the levers is provided with a collar portion 65 to which is connected the clevis 66 which, through the tubing 70, is connected to the respective brake arms 12 and 13.

The levers 63 and 64 are each provided with laterally offset abutment portions 72 which overlap in such manner that when the levers tend to separate due to tension applied to the tubing 70 by actuation of the brake mechanism, the abutments 72 come into engagement locking the levers against further separating movement so that the tension is applied through the pick up levers to the remote brake actuating arm 13. When this tension is released, the levers 63 and 64 may move away from each other, and consequently the arms 9 and 13 are free to move toward each other to allow lost motion in the hand brake linkage so that upon application of the power brakes, the arms 9 and 13 are free to move to brake applying position without any interference from the hand brake mechanism.

Each of the levers 63 and 64 is provided with a hub portion 75 journalled by means of bushings or the like, as indicated at 76, on enlarged shoulder portions of the pin 62. This pin is preferably held in fixed position by being welded or otherwise rigidly secured as indicated at 77 to the equalizer bar 30.

It is therefore believed apparent that I have provided an equalizing pick-up lever arrangement for hand brake linkages of this general type, which allows lost motion in the hand brake linkage to accommodate power actuation of the brakes without interference from the hand brake linkage, and which also serves to prevent rattling or vibration of the hand brake linkage parts when in brake-released position.

I am aware that various changes may be made in certain details of construction of the invention, and I therefore do not intend to be limited to the specific forms herein illustrated and described, but only insofar as defined by the scope and spirit of the appended claims.

I claim:

1. A brake rigging for a rail car truck including a pair of brake cross shafts, arms thereon, flexible tension means between said arms, said tension means including a pair of coaxially pivoted levers carried by the truck and connected into said tension means intermediate the ends thereof, said levers having interengaging abutment means for transferring tension through said tension means upon relative pivotal movement away from each other and having lost motion for taking up slack upon release of said tension, and spring means biased betwen said levers for normally urging said levers toward each other to take up said slack.

2. In brake rigging for a rail truck, a pair of motion transmitting members extending longitudinally of the truck from opposite ends thereof, a pair of levers having a common pivot intermediate the adjacent ends of said members and respectively connected to said members, said levers having abutting laterally offset projections limiting relative movement of said levers away from each other, means for applying tension to one of said members whereby said levers have relative pivotal movement until said projections engage and then transmit said tension to the other of said members, and means inter-engaging between said levers, preventing axial separation thereof.

3. The brake rigging of claim 2 further characterized in the provision of means for adjusting the point of connection of said levers to said members to take up any stretch in said members.

4. The brake rigging of claim 2 further characterized in the provision of spring means tensioned between said levers tending to move the same toward each other to take up slack in said members.

5. The brake rigging of claim 2 further characterized in that said members comprise flexible tensions wires and said levers have spring means normally urging said levers toward each other to overcome any slack in said wires.

ALFRED O. WILLIAMS.